US011256583B2

(12) United States Patent
Li et al.

(10) Patent No.: US 11,256,583 B2
(45) Date of Patent: Feb. 22, 2022

(54) EFFICIENT HANDLING OF RAID-F COMPONENT REPAIR FAILURES

(71) Applicant: VMware, Inc., Palo Alto, CA (US)

(72) Inventors: Ruocheng Li, Milpitas, CA (US);
Enning Xiang, San Jose, CA (US);
Eric Knauft, San Francisco, CA (US);
Pascal Renauld, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 499 days.

(21) Appl. No.: 16/410,549

(22) Filed: May 13, 2019

(65) Prior Publication Data
US 2020/0364124 A1 Nov. 19, 2020

(51) Int. Cl.
G06F 11/20 (2006.01)
G06F 11/14 (2006.01)
G06F 11/16 (2006.01)
G06F 3/06 (2006.01)

(52) U.S. Cl.
CPC .......... G06F 11/2069 (2013.01); G06F 3/067 (2013.01); G06F 3/0619 (2013.01); G06F 3/0652 (2013.01); G06F 3/0689 (2013.01); G06F 11/1423 (2013.01); G06F 11/167 (2013.01); G06F 11/2071 (2013.01)

(58) Field of Classification Search
CPC ............. G06F 11/1088; G06F 11/1423; G06F 11/167; G06F 11/2069; G06F 11/2071; G06F 3/0619; G06F 3/0652; G06F 3/067; G06F 3/0689
See application file for complete search history.

(56) References Cited

U.S. PATENT DOCUMENTS

| 6,161,111 A * | 12/2000 | Mutalik ................ G06F 3/0619 707/823 |
| 7,165,079 B1 * | 1/2007 | Chen ....................... G06F 16/10 |
| 7,461,176 B2 * | 12/2008 | Watanabe ............. G06F 3/0611 710/5 |
| 7,840,537 B2 * | 11/2010 | Gokhale ............. G06F 16/1748 707/652 |
| 7,921,267 B1 * | 4/2011 | Yadav ................. G06F 11/2082 711/162 |
| 8,612,382 B1 * | 12/2013 | Patel .................... G06F 11/0793 707/609 |
| 10,402,277 B2 * | 9/2019 | Ngo ..................... G06F 11/1451 |
| 2009/0164839 A1 * | 6/2009 | Ogihara .............. G06F 11/2082 714/6.12 |
| 2012/0239630 A1 * | 9/2012 | Wideman ............ G06F 11/1456 707/692 |

* cited by examiner

Primary Examiner — Joseph O Schell

(57) ABSTRACT

In one set of embodiments, a storage system can execute a repair process for a first component of a file or object stored on the storage system, where the repair process is initiated in response to the first component becoming inaccessible by the storage system, and where the file or object is split across a plurality of components including the first component. The executing can include, for each chunk in an address space of the first component starting from an initial chunk pointed to by a cursor: (1) determining whether the chunk is mapped to the first component, (2) if the chunk is mapped to the first component, copying data for the chunk from a mirror copy of the first component to a second component in the plurality of components, and (3) updating the cursor to point to a next chunk in the address space.

21 Claims, 9 Drawing Sheets

EFFICIENT HANDLING OF RAID-F COMPONENT REPAIR FAILURES

BACKGROUND

RAID-F is a RAID (Redundant Array of Independent Disks) storage scheme that enables a file or object to be split (i.e., striped) across multiple storage devices/nodes of a storage system in a flexible manner. In a scenario where a file/object is striped via RAID-F, it is possible for one of the striped portions (referred to herein as a "component") to become unavailable for some period of time. This may occur due to, e.g., a software or hardware failure at the storage device/node where that component is stored. When this happens, a RAID-F component repair process is typically carried out that replicates the data in the unavailable component to one or more other available components. However, in certain cases this repair process can fail before it completes, which can require a significant amount of system resources to handle.

DETAILED DESCRIPTION

Embodiments of the present disclosure are directed to techniques for efficiently handling RAID-F component repair failures in a storage system. For purposes of explanation, numerous examples and details are set forth in the following description. It will be evident, however, to one skilled in the art that some embodiments may be practiced without some of these details, or may be practiced with modifications or equivalents thereof.

Figure 1:
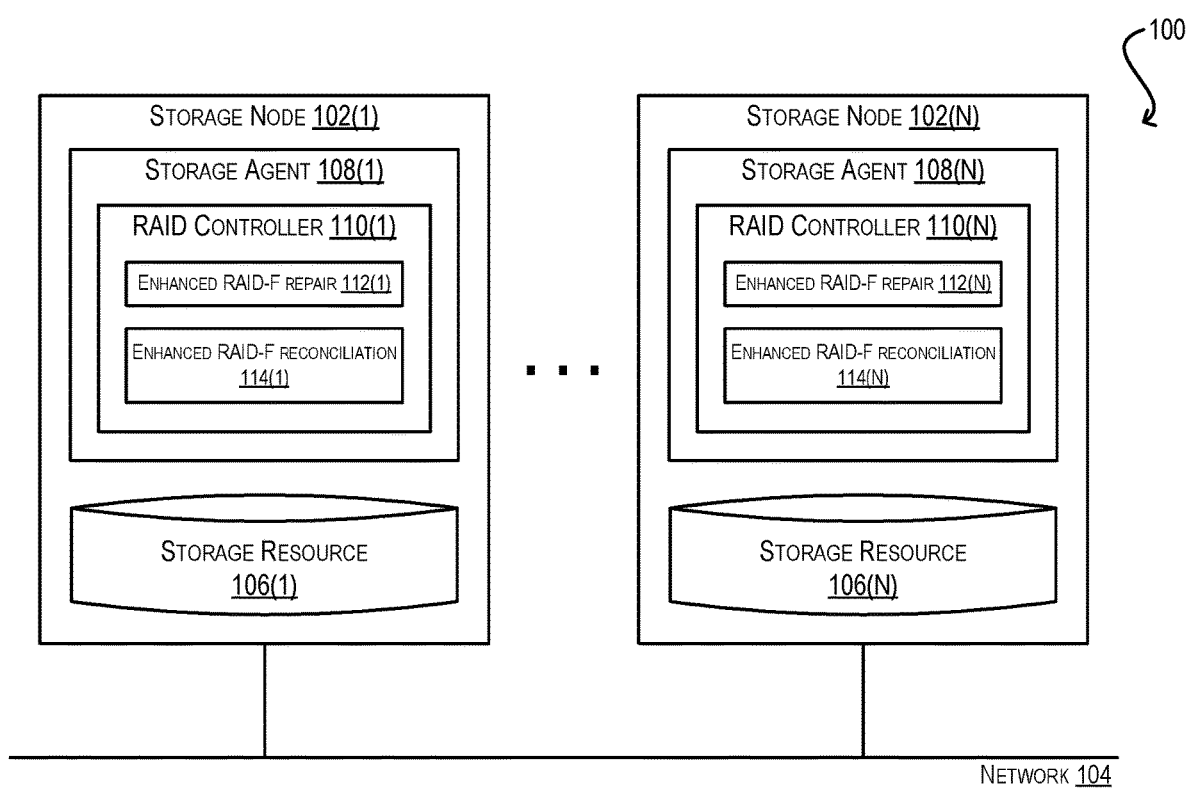
FIG. 1 depicts a storage system that implements efficient handling of RAID-F component repair failures according to an embodiment.

FIG. 1 is a simplified block diagram of a storage system 100 that implements the techniques of the present disclosure according to certain embodiments. As shown, storage system 100 comprises a number of storage nodes 102(1)-(N) that are communicatively coupled via a network 104. In one set of embodiments, storage nodes 102(1)-(N) may be general purpose computer systems that provide compute as well as storage services, such as host systems in a hyper-converged infrastructure (HCI). In other embodiments, storage nodes 102(1)-(N) may be dedicated storage appliances or servers.

Each storage node 102 includes a storage resource 106 encompassing one or more local storage devices such as solid state disks (SSDs), magnetic disks, persistent memory devices, and the like. Storage resources 106(1)-(N) collectively hold the data content of storage system 100. In addition, each storage node 102 includes a storage agent 108 that executes various storage processing and management tasks with respect to a portion of the system's data that is assigned to (or in other words, "owned by") that agent. For example, if storage system 100 is an object-based storage system, each storage agent 108 can execute storage processing/management tasks with respect to a particular set of objects assigned to that agent (where an "object" is a container containing a body of data and associated metadata). Alternatively, if storage system 100 is a file-based storage system, each storage agent 108 can execute storage processing/management tasks with respect to a particular set of files assigned to that agent.

In the example of FIG. 1, each storage agent 108 includes a RAID controller 110 that, among other things, allows agent 108 to implement RAID-F with respect to its assigned files/objects. RAID-F is a new type of RAID storage scheme that improves read/write performance by striping a file or object across multiple storage locations in a manner similar to RAID 0, but enables this striping to be performed in a more flexible (e.g., user-defined) way.

Figure 2:
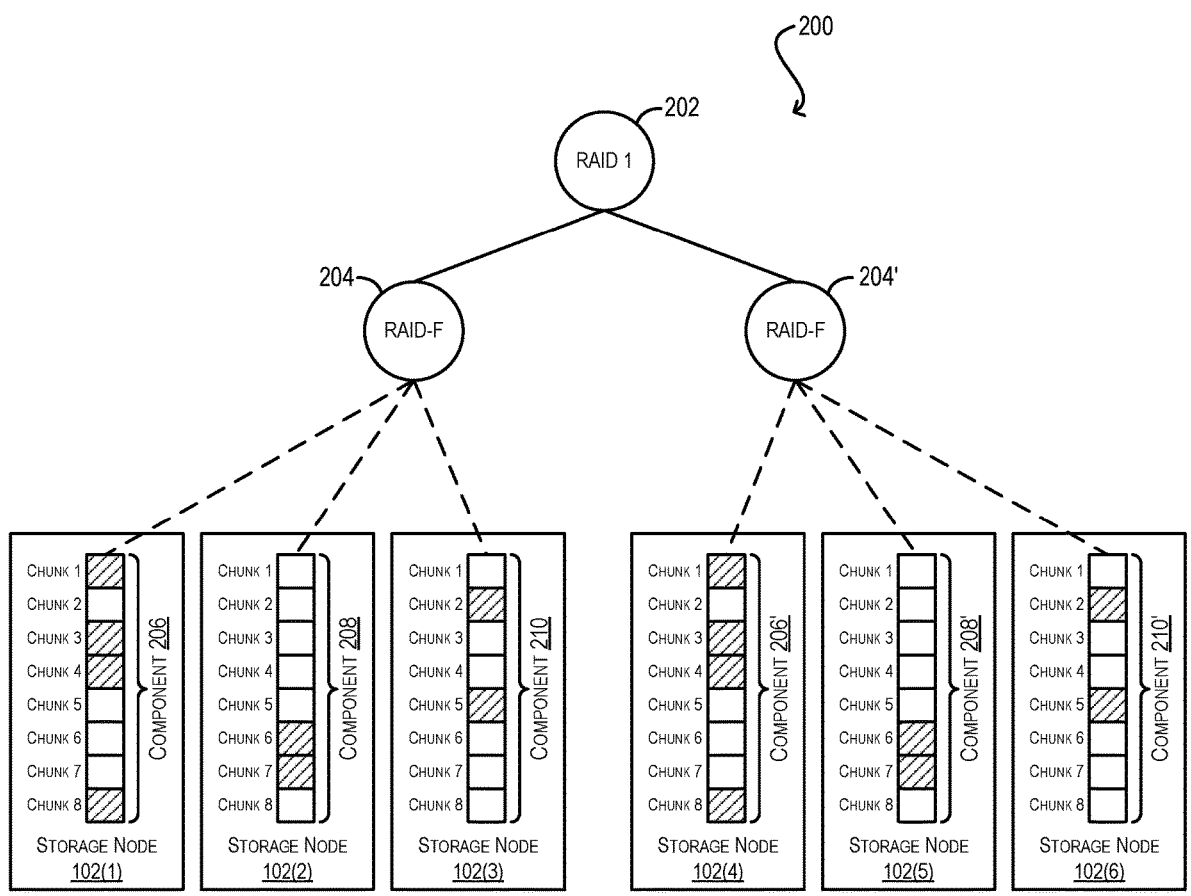
FIG. 2 depicts a schematic tree representation of a file/object that is mirrored using RAID 1 and striped using RAID-F according to an embodiment.

To clarify how RAID-F works, FIG. 2 depicts a schematic tree 200 of an example file/object in storage system 100 that is (1) mirrored using RAID 1 and (2) striped using RAID-F. RAID 1 and RAID-F are commonly combined in this way in order to provide both data redundancy and improved performance. As shown in FIG. 2, tree 200 includes a top-level RAID 1 node 202 that has two child RAID-F nodes 204 and 204'. The left-hand subtree rooted by RAID-F node 204 represents one complete copy of the file/object (referred to as the left-hand copy) and the right-hand subtree rooted by RAID-F node 204' represents another complete copy of the file/object (referred to as the right-hand copy). Per the mechanics of RAID 1, the right-hand copy is kept in sync with the left-hand copy (or vice versa).

Under RAID-F node 204, there are three sibling components 206, 208, and 210 that each correspond to a striped portion of the left-hand copy of the file/object. In this example, components 206, 208, and 210 are physically stored on storage nodes 102(1), 102(2), and 102(3) of storage system 100 respectively. The file/object's address space is replicated in each component 206/208/210 and this address space is divided into fixed-size units known as chunks. The data content of the left-hand copy is distributed across components 206, 208, and 210 by mapping each chunk in the address space to a particular component, which holds the data for that chunk. For instance, as depicted here, chunks 1, 3, 4, and 8 are mapped to component 206, chunks 6 and 7 are mapped to component 208, and chunks 2 and 5 are mapped to component 210. The flexibility of RAID-F stems from the fact that these chunk-to-component mappings can be user-defined and modified as needed, with the primary restriction being that a given chunk can only be mapped to a single sibling component at a time. This is to avoid "chunk conflicts" where two sibling components hold data for the same chunk (in which case it may be difficult or time-consuming to determine which copy is the most up-to-date version).

Under RAID-F node 204', there are three sibling components 206', 208', and 210' that each hold a portion of the right-hand copy of the file/object. In this example, components 206', 208', and 210' are physically stored on storage nodes 102(4), 102(5), and 102(6) of storage system 100 respectively. Like the left-hand copy, the file/object's address space is replicated in each component 206'/208'/210' and is divided into chunks. The data content of the right-hand copy is distributed across components 206', 208', and 210' by mapping each chunk in the address space to a particular component, which holds the data for that chunk. Because the right-hand copy is a mirror of the left-hand copy, the chunk mappings in components 206', 208', and 210' are identical to those of components 206, 208, and 210.

As noted in the Background section, when a file or object is striped via RAID-F, one or more of its components may occasionally become unavailable (in other words, go offline or become inaccessible by the storage system). For instance, in the example of FIG. 2, component 206 under left-hand RAID-F node 204 may become unavailable due to a software or hardware failure on storage node 102(1). Under these circumstances, the storage agent that owns the file/object will initiate a RAID-F component repair process (typically after some threshold period of unavailability, such as one hour) that attempts to reconstruct the data content of the unavailable component in one or more available sibling components under the same RAID-F node, thereby ensuring that a complete copy of the file/object is available with respect to that node. This repair process usually involves copying the chunks mapped to the unavailable component from a RAID 1 mirror copy to the available sibling component(s). Once the repair process is complete, the unavailable component is removed from the RAID tree of the file/object since it is no longer needed.

However, in some cases a component that has gone offline and triggered the repair process may subsequently come back online while the repair process for that component is in-progress. In these cases, the owner storage agent will abort/fail the repair process and attempt to restore that component, referred to as the "returning" component, to an active state (i.e., a state where it is a valid and accessible part of the file/object's RAID tree).

As part of restoring the returning component to an active state, the storage agent will initiate a RAID-F component reconciliation process that looks for any chunk conflicts between the returning component and its sibling components that may have arisen while the returning component was down. As mentioned previously, a chunk conflict is a situation where two sibling components under the same RAID-F node hold data for the same chunk. This is undesirable because it can create confusion as to which sibling component contains the most up-to-date data for that chunk. If such a chunk conflict is found, the reconciliation process will resolve the chunk conflict by copying the latest version of the data for that chunk from one component to another and de-allocating the chunk containing stale data. Once all chunk conflicts have been resolved, the reconciliation process will conclude and the returning component will be restored to an active state within the file/object's RAID tree.

One problem with the foregoing series of events (i.e., repair start→unavailable component comes back online→repair abort→reconciliation) is that, by the nature of its operation, the repair process creates chunk conflicts that must be subsequently resolved via the reconciliation process if the repair process is aborted while in-flight. This is because the repair process replicates chunks in the unavailable component to another component under the same RAID-F node, and thus those replicated chunks will exist in at least two sibling components when the unavailable component comes back online.

Figure 3:
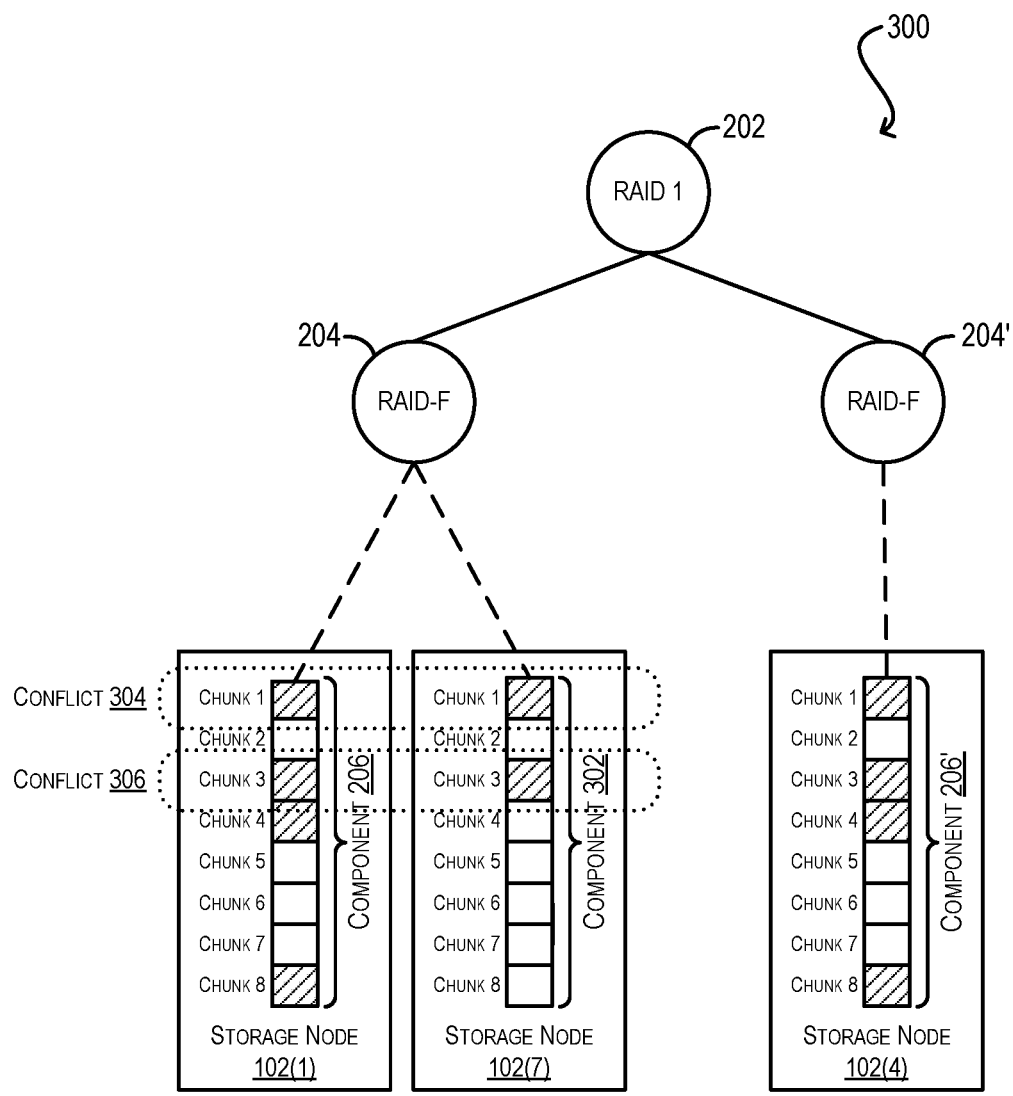
FIG. 3 depicts the state of a portion of the tree representation of FIG. 2 after a RAID-F component repair failure occurs according to an embodiment.

To illustrate this, FIG. 3 depicts the state of a subset of tree 200 of FIG. 2 (i.e., state 300) in the scenario where (1) component 206 under RAID-F node 204 initially goes down, (2) the owner storage agent of the file/object initiates a repair for component 206 that involves copying the chunks mapped to component 206 (i.e., chunks 1, 3, 4, and 8) from mirror component 206' under RAID-F node 204' to a brand new sibling component 302 under RAID-F node 204, and (3) component 206 comes back online after chunks 1 and 3 are copied from component 206' to component 302 but before chunks 4 and 8 are copied, which causes the repair to be aborted. As shown, this partially-completed repair creates chunk conflicts between component 302 and component 206 at chunks 1 and 3 (shown via reference numerals 304 and 306), each of which needs to be resolved via the reconciliation process.

Although component 206 is mapped to a relatively small number of chunks in this example for purposes of illustration, in practice such components may be mapped to thousands of chunks or more. Accordingly, if the repair process is aborted near the end of its execution run (e.g., after the majority of the unavailable component's chunks have been replicated), the reconciliation process may need to resolve a very large number of chunk conflicts, resulting in a significant amount of compute and I/O overhead for the storage system.

To address the forgoing and other issues, each storage agent 108 of FIG. 1 includes an enhanced RAID-F component repair module 112 and an enhanced RAID-F component reconciliation module 114 according to embodiments of the present disclosure. Although modules 112 and 114 are shown as being part of RAID controller 110, in alternative embodiments these modules may be implemented at any other location within the technology stack of storage agent 108.

As described in further detail below, module 112 enables its corresponding storage agent 108 to execute an enhanced RAID-F component repair process that maintains, during the repair of an unavailable component C, a "repair cursor" for C which tracks the chunks of that component that it has processed (i.e., the chunks of component C that it has evaluated and replicated to a sibling component, if warranted). Stated another way, this repair cursor is a chunk-level pointer that is sequentially moved from one chunk to the next chunk in the address space of component C as the chunks are processed. For instance, at the start of the repair process, the repair cursor may be initialized to point to the first chunk in the address space of component C. Once that first chunk has been processed, the repair cursor may be updated to point to the second chunk in the address space of component C. Once that second chunk has been processed, the repair cursor may be updated to point to the third chunk in the address space of component C, and so on.

Then, assuming the repair process for component C is aborted due to C becoming available again, module 114 enables storage agent 108 to execute an enhanced RAID-F component reconciliation process that de-allocates, at the start of the process, all chunks in the address space of component C that have been processed via the aborted repair process, as identified by the repair cursor. This de-allocation step eliminates all chunk conflicts created via the aborted repair process, since component C will no longer contain duplicate or conflicting data for chunks that have already been replicated in sibling component(s). This, in turn, advantageously reduces the amount of work that needs to be performed by the reconciliation process, resulting in better system performance.

Figure 4A:
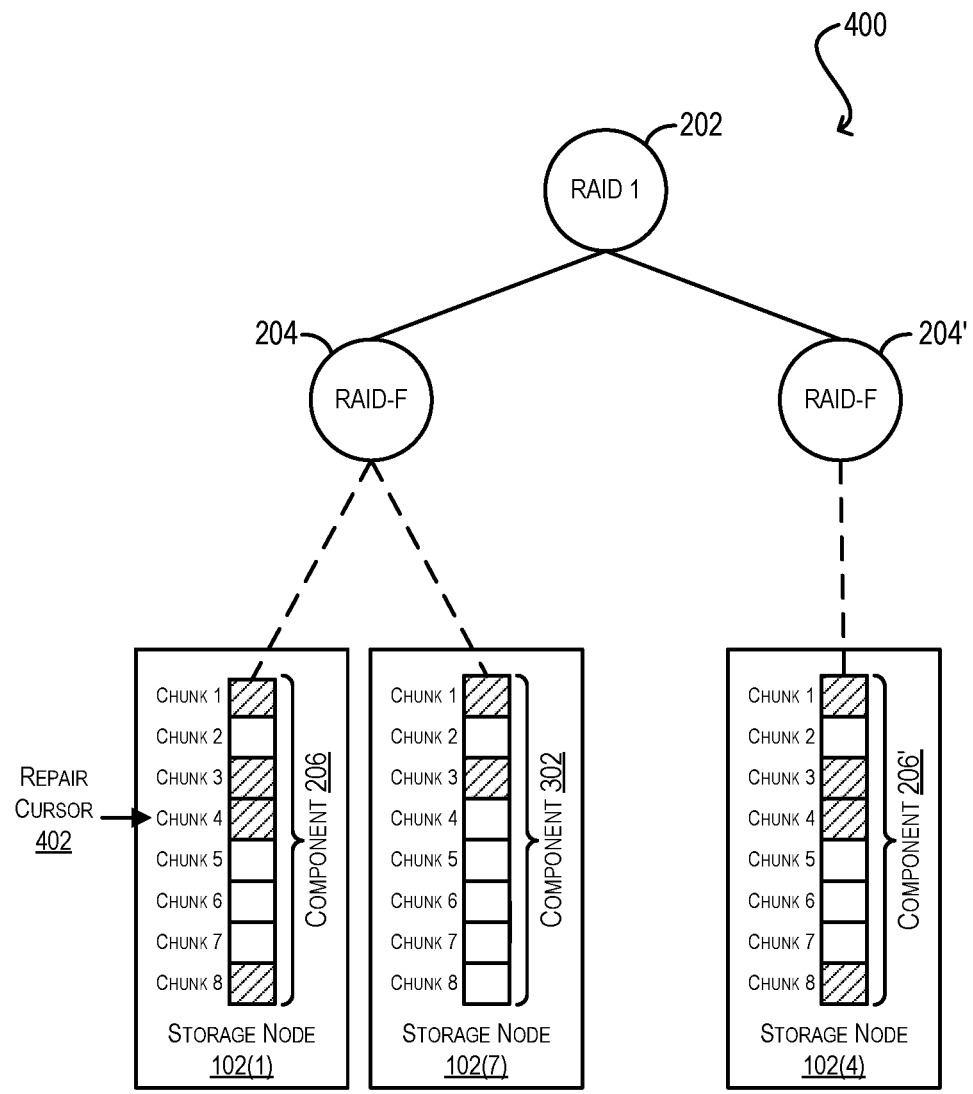
FIGS. 4A, 4B, and 4C depict various states of a portion of the tree representation of FIG. 2 after a RAID-F component repair failure is handled via the techniques of the present disclosure according to an embodiment.
Figure 4B:
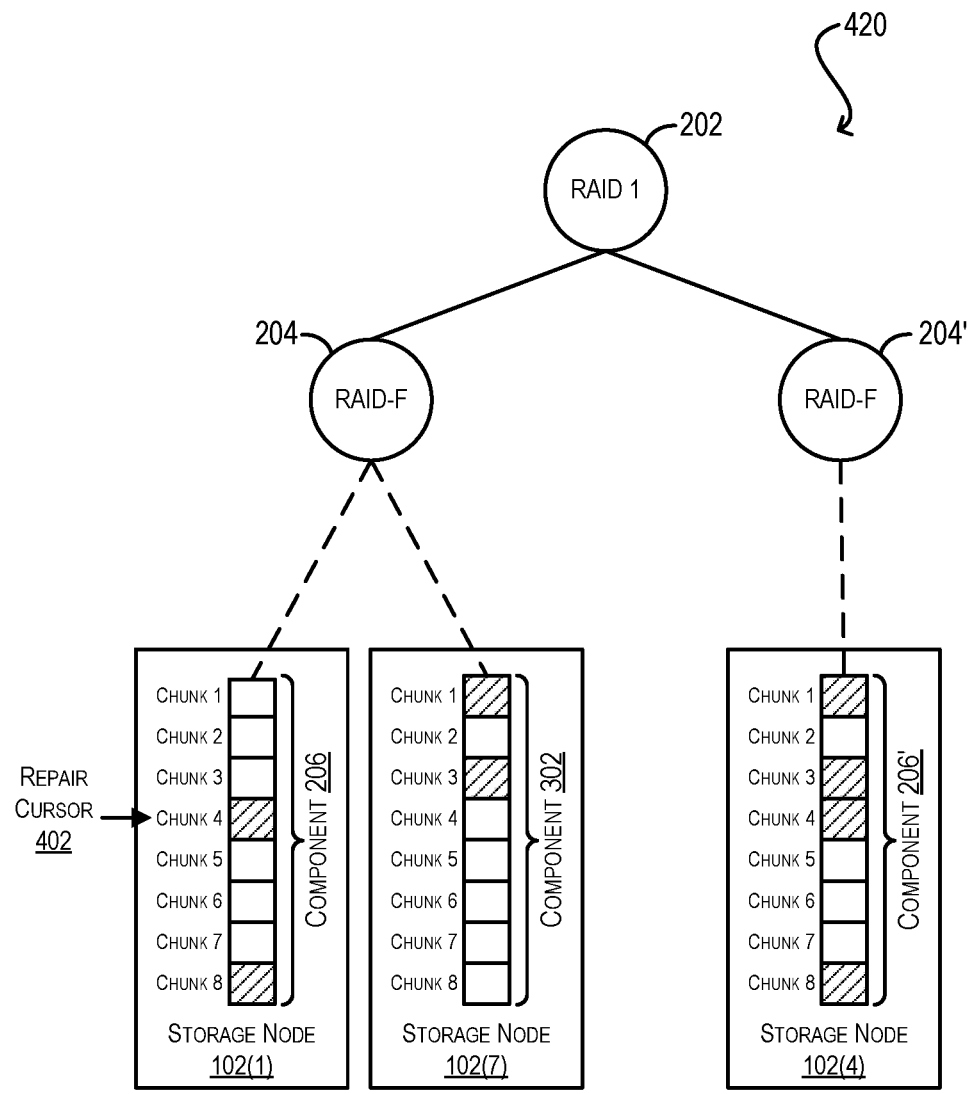
Figure 4C:
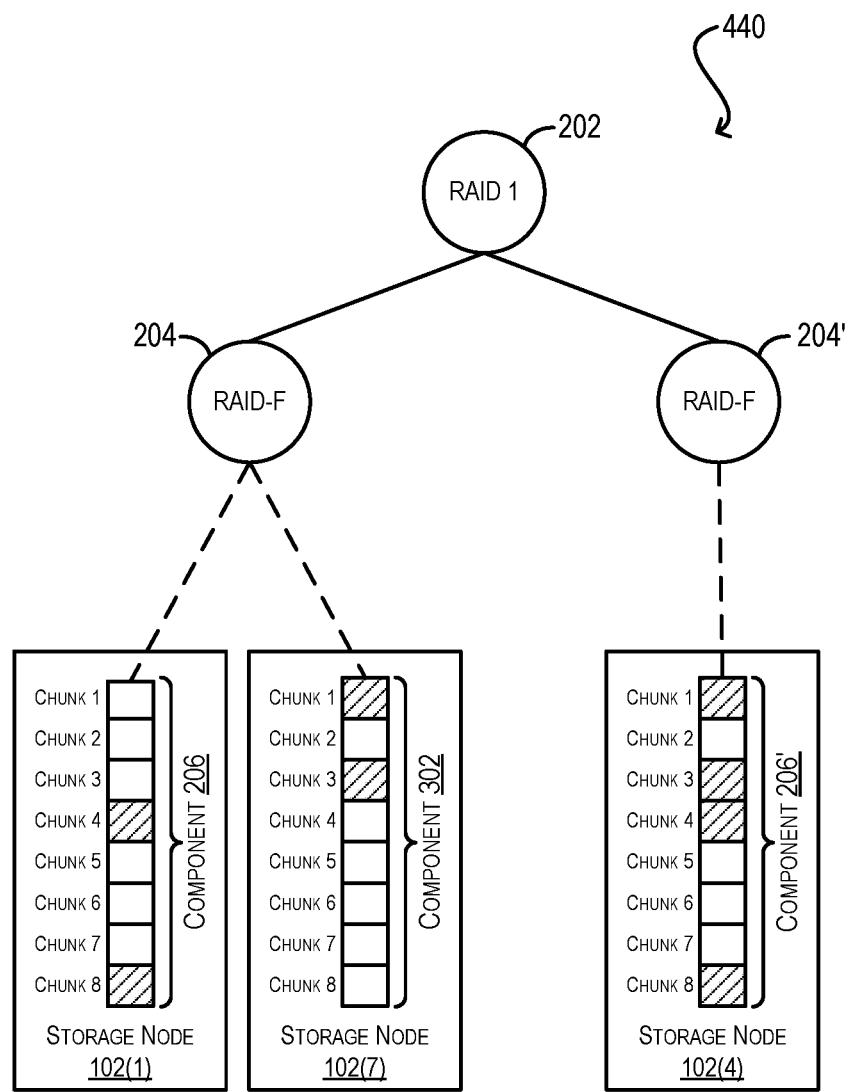

By way of example, FIGS. 4A, 4B, and 4C depict various states (400, 420, and 440) of a subset of tree 200 of FIG. 2 in the scenario where component 206 goes offline and comes back online, with the use of enhanced repair and reconciliation modules 112 and 114. The state shown in FIG. 4A is similar to state 300 of FIG. 3 in that component 206 has come back online after chunks 1 and 3 are copied from component 206' to component 302 but before chunks 4 and 8 are copied, thereby creating chunk conflicts at chunks 1 and 3. At this point, the repair process is aborted and repair cursor 402 points to chunk 4, which is the next chunk in the address space of component 206 that would have been processed via the repair.

In FIG. 4B, the reconciliation process is initiated and, at the start of this process, all of the chunks in the address space of component 206 before the location of repair cursor 402 are de-allocated (in other words, the contents of those chunks are marked as being empty/deleted). This eliminates the chunk conflicts between components 206 and 302 with respect to chunks 1 and 3. Finally, in FIG. 4C, the reconciliation process is completed and component 206 is returned to an active state.

Beyond reducing the amount of work that needs to be performed during reconciliation when an unavailable component becomes available again, one additional benefit of enhanced RAID-F component repair module 112 is that it can make the repair process more efficient in cases where the repair process needs to be restarted due to other error/failure conditions. For instance, consider a scenario where a repair of component 206 is initiated but fails while in-progress due to a temporary software or hardware failure. In this scenario, the repair process will typically be restarted once the failure is resolved. However, in conventional RAID-F implementations, because the repair process has no knowledge how much progress was made prior to the failure, it will begin processing chunks from the start of component 206's address space at the time of the restart, thereby potentially re-copying chunks that have already been copied.

With the repair cursor feature implemented in module 112, the repair process can instead check for the existence of a repair cursor for component 206 prior to beginning the current repair iteration. If such a repair cursor is found, the repair process can begin its processing from the location of the repair cursor (which indicates the chunk at which the prior repair for component 206 left off), rather than from the start of component 206's address space. In this way, the repair process can advantageously resume its prior progress and avoid duplicating work that it has already performed.

The remaining portions of this disclosure present specific workflows that may be performed by storage agents 108(1)-(N) for carrying out the enhanced RAID-F repair and reconciliation processes described above according to certain embodiments. It should be appreciated that the storage system architecture shown in FIG. 1 is illustrative and not intended to limit embodiments of the present disclosure. For example, although FIG. 1 depicts a particular arrangement of entities in storage system 100, other arrangements or configurations are possible depending on the specific system. Further, the various entities shown may have subcomponents or functions that are not specifically described. One of ordinary skill in the art will recognize other variations, modifications, and alternatives.

Figure 5:
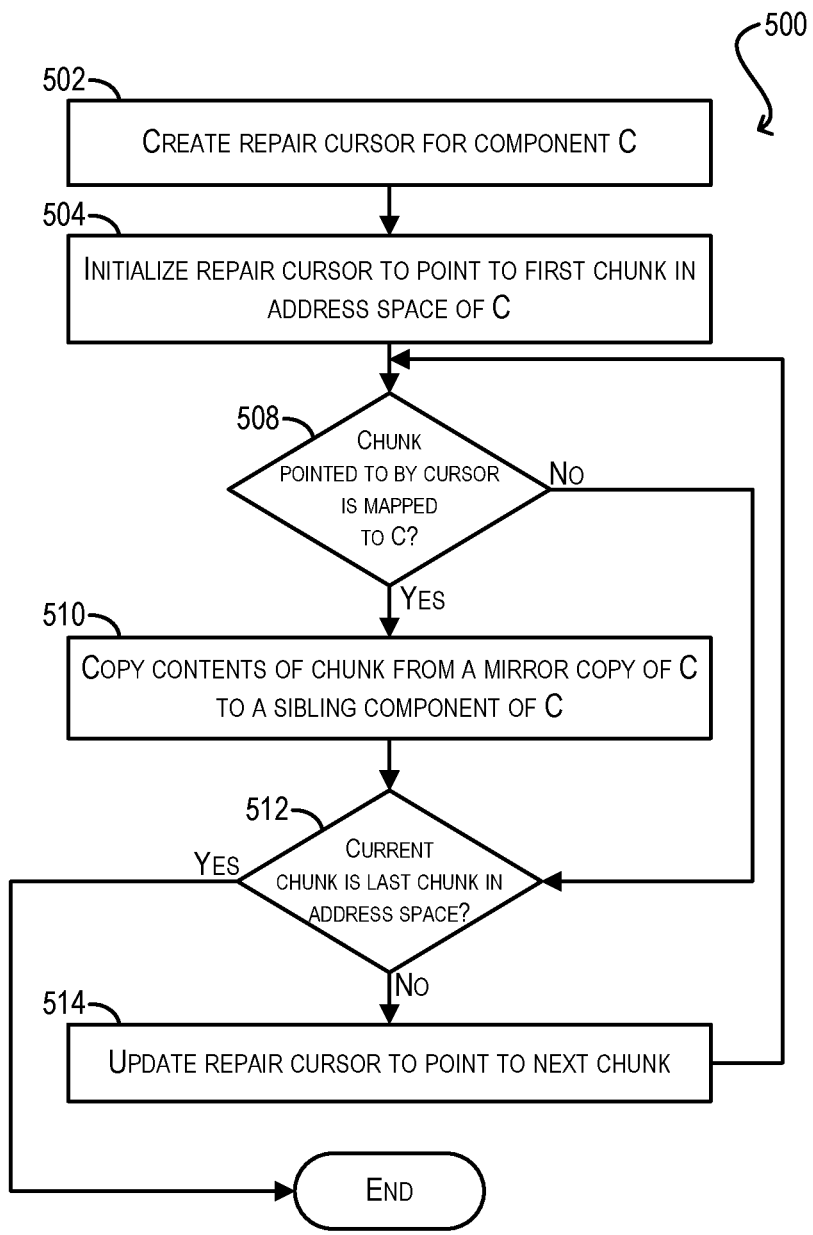
FIG. 5 depicts an enhanced RAID-F component repair workflow according to an embodiment.

FIG. 5 depicts a workflow 500 that may be executed by a storage agent 108 of FIG. 1 for carrying out an enhanced RAID-F repair of a given RAID-F component C (per the functionality provided by enhanced RAID-F component repair module 112) according to an embodiment.

Starting with blocks 502 and 504, storage agent 108 can create a repair cursor for component C and initialize the repair cursor to point to the first chunk in the address space of component C (which in turn corresponds to the address space of the file/object to which the component belongs).

At block 506, storage agent 108 can evaluate the chunk currently pointed to by the repair cursor and determine whether the chunk is mapped to component C. If so, storage agent 108 can identify a mirror copy of component C (e.g., a RAID 1 mirror component) and copy the data contents of this chunk from the mirror copy to a sibling component of C under the same RAID-F node (block 510).

Storage agent 108 can then check whether the chunk currently pointed to by the repair cursor is the last chunk in the address space (block 512). If not, storage agent 108 can update the repair cursor to point to the next chunk in the address space (block 514) and return to block 508 in order to repeat the foregoing process for the next chunk. Otherwise, storage agent 108 can conclude that all of the chunks have been processed and thus terminate the workflow.

Although not shown in FIG. 5, in the situation where workflow 500 is aborted/failed prior to its completion (due to, e.g., component C becoming available again or a failure on the storage node running the storage agent), the current state of component C's repair cursor can be persisted to a pre-determined nonvolatile storage location. For example, in a particular embodiment this repair cursor may be persisted to a nonvolatile configuration of the file/object to which the component belongs.

Figure 6:
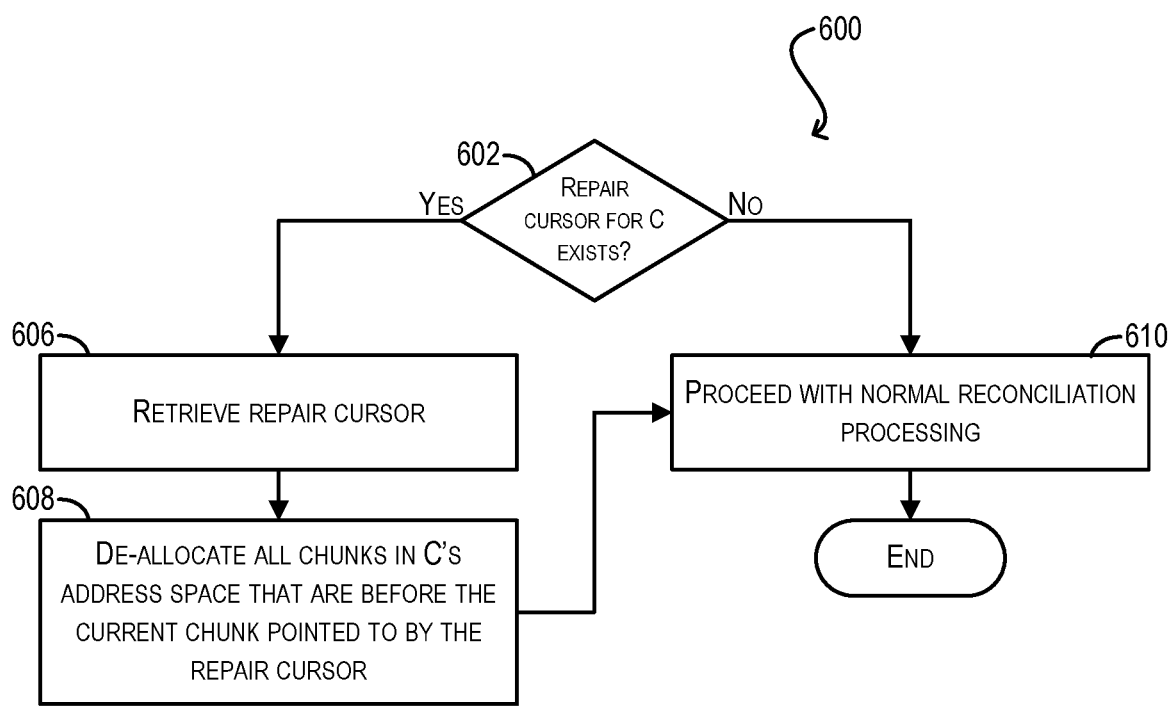
FIG. 6 depicts an enhanced RAID-F component reconciliation workflow according to an embodiment.

FIG. 6 depicts a workflow 600 that may be executed by a storage agent 108 of FIG. 1 for carrying out an enhanced RAID-F reconciliation of a given RAID-F component C and its sibling components (per the functionality provided by enhanced RAID-F component reconciliation module 114) according to an embodiment.

Starting with block 602, storage agent 108 can check whether a repair cursor for component C exists (which indicates that a prior repair of the component failed while in-progress). This step can involve looking for the repair cursor in volatile memory and/or the pre-determined nonvolatile storage location noted above.

If a repair cursor for component C does not exist, storage agent 108 can proceed with its normal reconciliation processing (block 604). Although the specifics of this processing are beyond the scope of the present disclosure, as mentioned previously it can generally involve looking for chunk conflicts between component C and its sibling components and resolving any such conflicts that are found.

On the other hand, if a repair cursor for component C does exist, storage agent 108 can retrieve the repair cursor (block 606) and de-allocate all chunks in the address space of component C that are before the current location of the repair cursor (block 608). For example, if the repair cursor points to chunk 35, storage agent 108 can de-allocate chunks 1-34. In various embodiments, this de-allocation marks those chunks as being empty/deleted.

Finally, storage agent 108 can transition to block 604 to proceed with its normal reconciliation processing and, once completed, workflow 600 can end.

Figure 7:
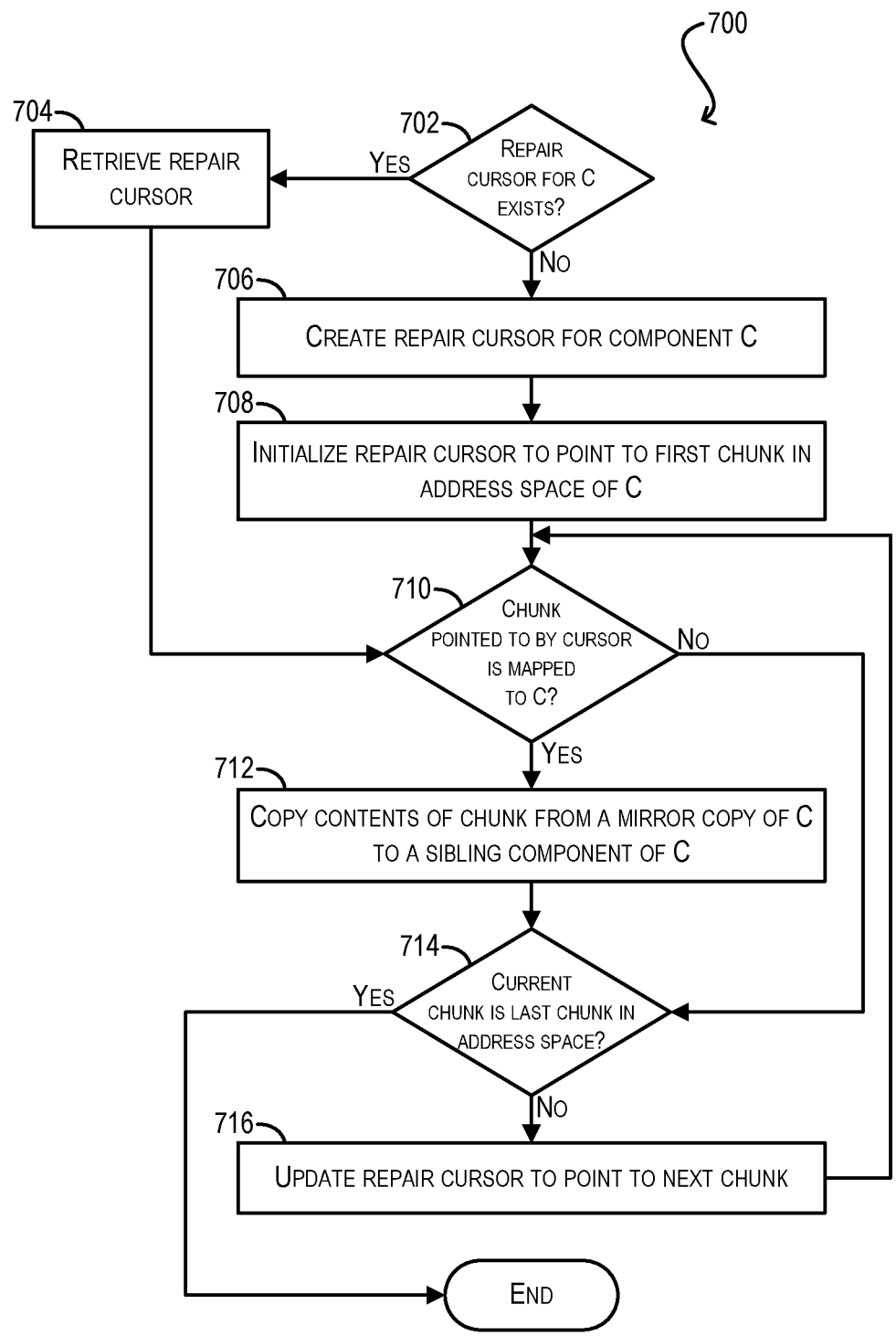
FIG. 7 depicts another enhanced RAID-F component repair workflow according to an embodiment.

FIG. 7 depicts an alternative workflow 700 that may be executed by a storage agent 108 of FIG. 1 for carrying out an enhanced RAID-F repair of a given RAID-F component C (per the functionality provided by enhanced RAID-F component repair module 112) according to an embodiment.

Blocks are 706-716 substantially similar to blocks 502-514 of repair workflow 500. However, at block 702, storage agent 108 can first check to determine whether a repair cursor for component C exists (e.g., either in memory or in storage). If so, storage agent 108 can retrieve that existing repair cursor (block 704) and use it for its repair processing.

In this way, storage agent 108 can resume from the point at which the previous repair operation for component C left off.

Otherwise, storage agent 108 can proceed with creating a new repair cursor and can use that new repair cursor for its repair processing as previously described with respect to workflow 500.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    executing, by a storage system, a repair process for a first component of a file or object stored on the storage system, wherein the repair process is initiated in response to the first component becoming inaccessible by the storage system, wherein the file or object is split across a plurality of components including the first component, and wherein the executing includes, for each chunk of multiple chunks in an address space of the first component starting from an initial chunk pointed to by a cursor:
        determining whether the chunk is mapped to the first component;
        if the chunk is mapped to the first component, copying data for the chunk from a mirror copy of the first component to a second component in the plurality of components; and
        updating the cursor to point to a next chunk in the address space.

2. The method of claim 1 wherein the cursor is initialized to point to the initial chunk in the address space of the file or object.

3. The method of claim 1 wherein, upon occurrence of a failure of the repair process, the cursor is persisted to a pre-determined nonvolatile storage location.

4. The method of claim 1 wherein prior to the executing, an existing instance of the cursor is retrieved from memory or from a pre-determined nonvolatile storage location, the existing instance corresponding to a prior partially-completed repair of the first component.

5. The method of claim 1 further comprising:
    aborting the repair process in response to determining that the first component has become accessible again.

6. The method of claim 5 further comprising:
    in response to aborting the repair process, executing a reconciliation process for the plurality of components, the executing of the reconciliation process including:
        retrieving the repair cursor from memory or from a pre-determined nonvolatile storage location;
        determining a current chunk in the address space currently pointed to by the retrieved repair cursor;
        de-allocating a chunk in the first component that appears before the current chunk in the address space.

7. The method of claim 6 wherein the executing of the reconciliation process further includes:
    identifying chunk conflicts between the first component and other components in the plurality of components; and
    resolving the chunk conflicts.

8. A non-transitory computer readable storage medium having stored thereon program code executable by a storage node of a storage system, the program code embodying a method comprising:

executing a repair process for a first component of a file or object stored on the storage system, wherein the repair process is initiated in response to the first component becoming inaccessible by the storage system, wherein the file or object is split across a plurality of components including the first component, and wherein the executing includes, for each chunk of multiple chunks in an address space of the first component starting from an initial chunk pointed to by a cursor:

determining whether the chunk is mapped to the first component;

if the chunk is mapped to the first component, copying data for the chunk from a mirror copy of the first component to a second component in the plurality of components; and updating the cursor to point to a next chunk in the address space.

9. The non-transitory computer readable storage medium of claim 8 wherein the cursor is initialized to point to the initial chunk in the address space of the file or object.

10. The non-transitory computer readable storage medium of claim 8 wherein, upon occurrence of a failure of the repair process, the cursor is persisted to a pre-determined nonvolatile storage location.

11. The non-transitory computer readable storage medium of claim 8 wherein prior to the executing, an existing instance of the cursor is retrieved from memory or from a pre-determined nonvolatile storage location, the existing instance corresponding to a prior partially-completed repair of the first component.

12. The non-transitory computer readable storage medium of claim 8 wherein the method further comprises:

aborting the repair process in response to determining that the first component has become accessible again.

13. The non-transitory computer readable storage medium of claim 12 wherein the method further comprises:

in response to aborting the repair process, executing a reconciliation process for the plurality of components, the executing of the reconciliation process including:

retrieving the repair cursor from memory or from a pre-determined nonvolatile storage location;

determining a current chunk in the address space currently pointed to by the retrieved repair cursor;

de-allocating a chunk in the first component that appears before the current chunk in the address space.

14. The non-transitory computer readable storage medium of claim 13 wherein the executing of the reconciliation process further includes:

identifying chunk conflicts between the first component and other components in the plurality of components; and resolving the chunk conflicts.

15. A storage system comprising:
a processor;
a set of one or more storage resources;
and a non-transitory computer readable medium having stored thereon program code that, when run, causes the processor to:

execute a repair process for a first component of a file or object stored on the set of one or more storage resources, wherein the repair process is initiated in response to the first component becoming inaccessible by the storage system, wherein the file or object is split across a plurality of components including the first component, and wherein the executing includes, for each chunk of multiple chunks in an address space of the first component starting from an initial chunk pointed to by a cursor:

determining whether the chunk is mapped to the first component;

if the chunk is mapped to the first component, copying data for the chunk from a mirror copy of the first component to a second component in the plurality of components; and updating the cursor to point to a next chunk in the address space.

16. The storage system of claim 15 wherein the cursor is initialized to point to the initial chunk in the address space of the file or object.

17. The storage system of claim 15 wherein, upon occurrence of a failure of the repair process, the repair cursor is persisted to a pre-determined nonvolatile storage location.

18. The storage system of claim 15 wherein prior to the executing, an existing instance of the cursor is retrieved from memory or from a pre-determined nonvolatile storage location, the existing instance corresponding to a prior partially-completed repair of the first component.

19. The storage system of claim 15 wherein the program code further causes the processor to:

abort the repair process in response to determining that the first component has become accessible again.

20. The storage system of claim 19 wherein the program code further causes the processor to:

in response to aborting the repair process, execute a reconciliation process for the plurality of components, the executing of the reconciliation process including:

retrieving the repair cursor from memory or from a pre-determined nonvolatile storage location;

determining a current chunk in the address space currently pointed to by the retrieved repair cursor;

de-allocating a chunk in the first component that appears before the current chunk in the address space.

21. The storage system of claim 20 wherein the executing of the reconciliation process further includes:

identifying chunk conflicts between the first component and other components in the plurality of components; and resolving the chunk conflicts.

* * * * *